United States Patent [19]

O'Neal

[11] 3,968,686

[45] July 13, 1976

[54] FLOW INDICATOR

[75] Inventor: Allen O'Neal, Park Forest, Ill.

[73] Assignee: Libby, McNeil & Libby, Chicago, Ill.

[22] Filed: Sept. 24, 1974

[21] Appl. No.: 508,875

[52] U.S. Cl. .................................. 73/207; 73/208; 99/342; 220/DIG. 16
[51] Int. Cl.² ........................................ G01F 1/20
[58] Field of Search ............ 73/207, 208, 209, 228; 116/117 R, 117 B, 70, 112; 126/388; 220/203, DIG. 16, 367; 99/285, 342

[56] References Cited
UNITED STATES PATENTS

| | | | |
|---|---|---|---|
| 341,841 | 5/1886 | Gleason | 73/208 |
| 2,003,474 | 6/1935 | Schweitzer | 73/208 |
| 2,559,196 | 7/1951 | Medved | 220/367 X |
| 2,827,008 | 3/1958 | Hodge | 73/207 X |
| 3,759,099 | 9/1973 | McGregor | 73/207 |

FOREIGN PATENTS OR APPLICATIONS 268,670 12/1913 Germany .......................... 73/208

Primary Examiner—Jerry W. Myracle
Assistant Examiner—John P. Beauchamp
Attorney, Agent, or Firm—Hume, Clement, Brinks, Willian, Olds & Cook, Ltd.

[57] ABSTRACT

A flow indicator for measuring fluid flow through a pressure cooking vessel bleeder. The indicator comprises an elongated housing having a fluid passage formed therethrough which is vertically secured to the bleeder so that a fluid flow connection exists between the bleeder and a fluid inlet opening into said passage. An indicator ball is disposed within the passage and is suspended in the fluid flow emitting from the bleeder. A means for determining the vertical position of the ball within the passage is also provided which, in a preferred embodiment of the invention, comprises a measuring device such as a photoelectric cell circuit.

9 Claims, 4 Drawing Figures

3,968,686

FLOW INDICATOR

INTRODUCTION

The present invention relates generally to a flow indicator and, more particularly, to a flow indicator for measuring the fluid flow through a pressure cooking vessel bleeder.

BACKGROUND OF THE INVENTION

Throughout the canned food industry and other similar industries pressure cookers and retorts are used for cooking and sterilizing canned foods. These pressure cooking vessels utilize steam for cooking which is generally at temperatures above 212 °Fahrenheit and pressures above atmospheric pressure. For example, for fruit items the pressure cookers operate at 3 to 5 pounds per square inch above atmospheric pressure and for some meat items they operate up to an estimated 20 to 22 pounds per square inch above atmospheric pressure.

In order to assure uniform cooking, it is important that the pressure cooker be void of occluded air which may form pockets surrounding the items being cooked. In such instances, the air pockets will act as an insulator retarding heat transfer to the food containers and resulting in undercooking or misprocessing of the batch. Therefore, in order to remove such air from the cooking chamber, commercial pressure cookers are provided with bleeders through which air can escape. In a typical commercial installation, bleeders are generally in the form of pipes extending into the cooking chamber along the top of the pressure cookers and retorts. Each pressure cooker shell typically contains about six bleeders which are positioned so that the cooker operator can observe their emissions to insure that the cooker is operating properly and that clogging of the bleeder has not occurred. In addition, as many as three bleeders may be located along the bottom of cooker in order to allow condensate built up in the shell to drain. Whenever condensate is not being drained through these bleeders, steam will be emitted therefrom as with the cooker top bleeders. A single operator may observe as many as 8 or 10 cooker shells, having between 40 and 60 bleeders, on a continuing basis during a work shift.

SUMMARY OF THE INVENTION

In view of the critical role that bleeders play in preventing air occlusion and allowing condensate drainage during the pressure cooking operation, it is important that the bleeders be functioning properly at all times in order to insure proper heat distribution and penetration within the cooking vessel. In conventional commercial installations, this is accomplished by visual observation made by the operator of the amount of steam emitting from the bleeder.

In some instances, the emissions are easy to visually distinguish. However, in many instances such observations become extremely difficult due to the position of the cooker shells and bleeders in relation to each other, the background against which the emissions are observed, and the generally limited attention span that can be expected of an operator throughout his work shift. Hence, the present invention was developed in order to overcome these problems experienced in conventional installations by providing an inexpensive, reliable, and positive indicator of bleeder and cooker performance.

According to the present invention, this is accomplished by providing a highly visable and reliable flow indicator attached to the individual bleeder which positively measure the air and steam emitting therefrom. The indicator comprises an elongated housing having a fluid passage formed therethrough. The housing is secured to the bleeder in a vertical position and a fluid connection is established between the bleeder and an inlet opening into the fluid passage. An indicator ball is disposed within the fluid passage which is suspended in the flow of air and steam emitting from the bleeder. In this manner the operation of the bleeder may be quickly and easily monitored by visually observing the vertical position of the ball within the passage or by utilizing some other means for determining its position, such as a photoelectric cell circuit.

DESCRIPTION OF THE PREFERRED EMBODIMENT

Figure 1:
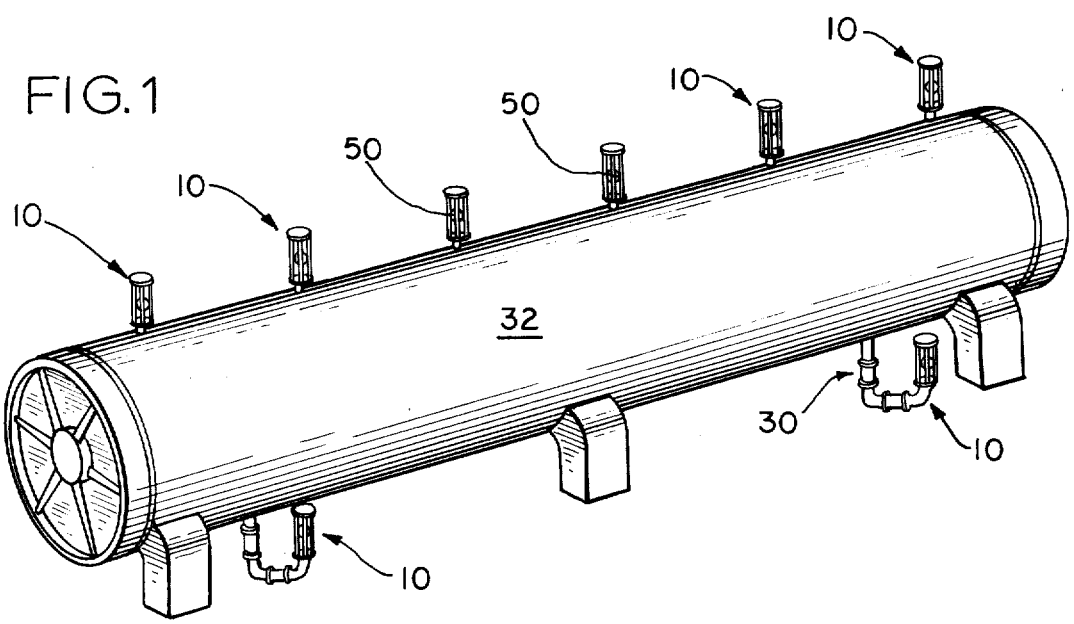
FIG. 1 is an assembly view of a flow indicator constructed in accordance with an embodiment of the present invention mounted on a pressure cooking vessel.
Figure 2:
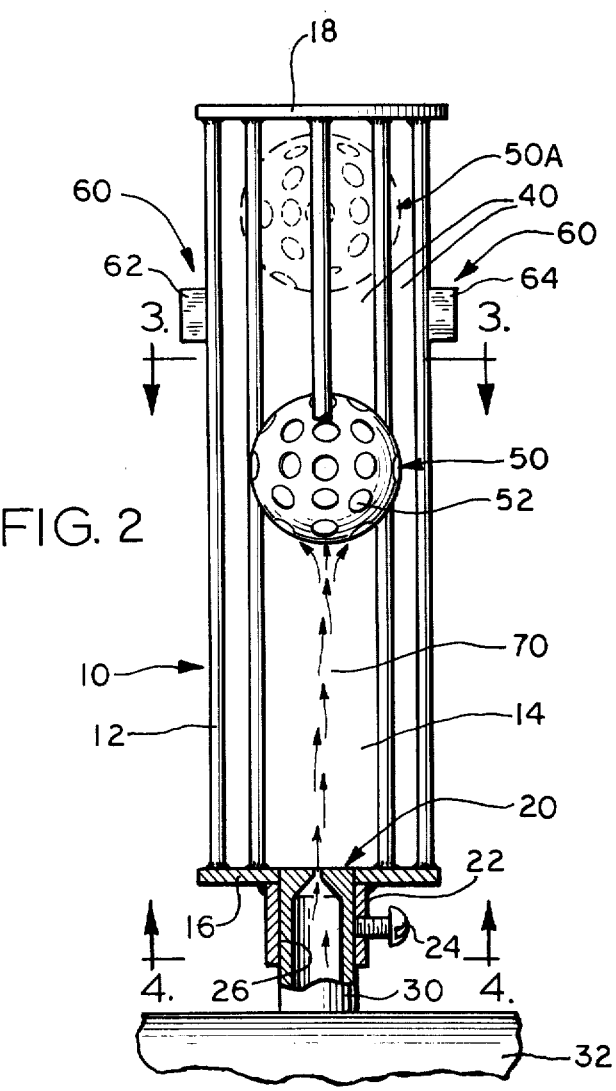
FIG. 2 is a partial side elevational view of a flow indicator 10 of FIG. 1.
Figure 3:
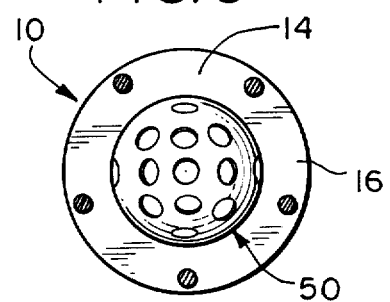
FIG. 3 is a top view in section taken along line 3—3 of FIG. 2.
Figure 4:
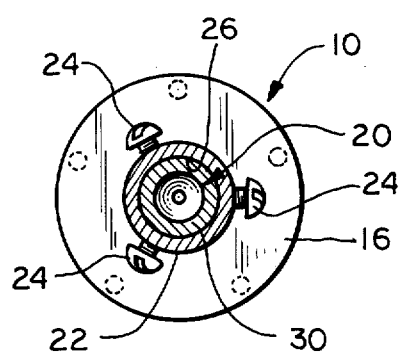
FIG. 4 is a bottom view in section taken along line 4—4 of FIG. 2.

FIGS. 2–4 illustrate an embodiment of a flow indicator 10 constructed in accordance with the present invention. Flow indicator 10 includes an elongated housing 12 having a cylindrical fluid passage 14 formed therethrough which is enclosed at ends 16, 18. Disposed at end 16 of passage 14 is a fluid inlet opening 20 having a collar 22 mounted about it. At various opposing points about the diameter of collar 22, a plurality of set screws 24 extend through the collar and beyond inner surface 26. Collar 22 has an internal diameter larger than the external diameter of the bleeder, which in most applications is in the form of a pipe 30 protruding from the top of the pressure cooker 32. Flow indicator 10 is secured to pipe 30 in a vertical position as illustrated in FIG. 1 by tightening set screws 24 against the bleeder pipe which is positioned within collar 22. In this manner air and steam can flow through bleeder pipe 30 into inlet opening 20 of passage 14.

Housing 12 has a plurality of vertical slots 40 formed along its length which open into passage 14. These slots have a width smaller than the diameter of indicator ball 50 which is disposed within passage 14. The diameter of indicator ball 50 is less than the diameter of passage 14 in which it is capable of vertical movement. In the preferred embodiment of the invention shown in FIGS. 2–3, indicator ball 50 is constructed of a lightweight plastic having perforations 52 formed in its surface which allow steam condensate to pass therethrough.

Whenever there is no air or steam emission from bleeder pipe 30, indicator ball 50 will rest at the bottom, or end 16, of passage 14. However, whenever there is air or steam emissions from bleeder pipe 30, indicator ball 50 will be suspended in the flow as the emissions escape into the atmosphere through slots 40. This suspension of the indicator ball is illustrated in FIG. 2 wherein the emission flow is indicated by arrows 70.

The weight and density of ball 50 is selected so that it will be suspended within passage 14 at a predetermined vertical level corresponding to the desired pressure level to be maintained within the cooker. Hence, as the desired pressure level within the cooker and the corresponding air and steam emissions from bleeder pipe 30 increase or decrease, ball 50 will be suspended either above or below the predetermined vertical level within passage 14. In addition, the ball must be selected of a material that is sturdy and corrosion resistive, and be of a diameter which will allow free movement within passage 14.

Accordingly, in operation the cooker operator may quickly and positively determine whether the cooker and bleeders are properly functioning by observing the vertical position of ball 50 through slots 40 as is best illustrated in FIG. 1. In an alternated embodiment of the invention, this function is performed by mounting a conventional photoelectric cell circuit 60 along the vertical sides of housing 12 as is illustrated in FIG. 2. In this manner, the light beam between photoelectric elements 62, 64 which extends across passage 14 will be interrupted whenever the indicator ball (illustrated by phantom ball 50A) falls below a predetermined vertical level. This level, which corresponds to the pressure of the air and steam emissions from bleeder pipe 30, may be varied for different cooking operations by adjusting the vertical level of photoelectric elements 62, 64 along housing 12. Photoelectric cell circuit 60 may be utilized to engage an alarm bell or other such common indicator whenever it is activated by the indicator ball 50 interrupting the light beam between elements 62, 64. Of course, other measuring devices such as a trip-wire sensor within passage 14 may be utilized to activate the alarm indicator whenever the ball falls below the predetermined level.

While particular embodiments of the present invention have been shown and described, it should be understood that various changes and modification thereto may be made, and it is therefore intended in the following claims to include all such modifications and changes as may fall within the true spirit and scope of this invention.

What is claimed is:

1. A flow indicator for measuring the fluid flow through a pressure cooking vessel bleeder, said indicator comprising:
    an elongated housing having a fluid passage formed therethrough;
    a fluid inlet opening disposed at one end of said passage and having a means for vertically securing said housing to said bleeder so that a fluid flow connection exists between said bleeder and fluid inlet opening;
    a lightweight perforated indicator ball disposed within said passage; and
    vertical slots having a width smaller than the diameter of said ball formed along the length of said housing and opening into said passage thereby providing for the external observation of the position of said ball with said passage and allowing fluid to escape from said passage whereby said ball is suspended in said fluid flow.

2. A flow indicator for measuring the fluid flow through a pressure cooking vessel bleeder, said indicator comprising:
    an elongated housing having a fluid passage formed therethrough;
    a fluid inlet opening disposed at one end of said passage and having a means for vertically securing said housing to said bleeder so that a fluid flow connection exists between said bleeder and fluid inlet opening;
    a lightweight indicator ball disposed within said passage;
    means for allowing fluid to escape from said passage whereby said ball is suspended in said fluid flow; and
    a photoelectric cell circuit which is activated whenever said ball falls below a predetermined vertical level thereby interrupting a light beam disposed across said passage at said level.

3. A flow indicator for measuring the fluid flow through a pressure cooking vessel bleeder, which comprises:
    an perforated indicator ball;
    an elongated housing surrounding said ball defining a passageway for the movement of said ball and having slots in flow communication with said passageway along the length of said housing of a width smaller than the diameter of said ball to allow fluid to escape from said passageway into the atmosphere; and
    a fluid inlet opening through one end of said housing to permit flow communication between said bleeder and said passageway.

4. The flow indicator of claim 3, wherein said indicator ball is constructed of lightweight plastic.

5. A flow indicator for measuring the fluid flow through a pressure cooking vessel bleeder, said indicator comprising:
    an elongated housing having a fluid passage formed therethrough;
    a fluid inlet opening disposed at one end of said passage and having a means for vertically securing said housing to said bleeder so that a fluid flow connection exists between said bleeder and fluid inlet opening;
    a perforated indicator ball disposed within said passage;
    means for allowing fluid to escape from said passage whereby said ball is suspended in said fluid flow; and
    means for determining the vertical position of said ball within said passage.

6. A flow indicator for measuring the fluid flow through a pressure cooking vessel bleeder, said indicator comprising:
    an elongated housing having a fluid passage formed therethrough;
    a fluid inlet opening disposed at one end of said passage and having a means for vertically securing said housing to said bleeder so that a fluid flow connection exists between said bleeder and fluid inlet opening;
    an indicator ball disposed within said passage;
    means for allowing fluid to escape from said passage whereby said ball is suspended in said fluid flow; and
    means for determining the vertical position of said ball within said passage comprising a control means for registering whenever said fluid suspended ball falls below a predetermined vertical level.

7. The flow indicator of claim 6 wherein said control means comprises a photoelectric cell circuit which is activated whenever said ball interrupts a light beam disposed across said passage.

8. The flow indicator of claim 7 wherein said control means further comprises an alarm that is engaged whenever said photoelectric cell circuit is activated.

9. The flow indicator of claim 6 wherein the indicator ball is perforated.

* * * * *